United States Patent [19]

McConnell

[11] 4,334,899
[45] Jun. 15, 1982

[54] SNAP FILTER GRILL AND ASSEMBLY

[76] Inventor: Paul A. McConnell, 806 Tabor, Houston, Tex. 77009

[21] Appl. No.: 252,373

[22] Filed: Apr. 9, 1981

[51] Int. Cl.³ .............................................. B01D 50/00
[52] U.S. Cl. ...................................... 55/321; 55/329; 55/332; 55/357; 55/419; 55/480; 55/501; 55/507; 55/509; 55/DIG. 31; 55/DIG. 35; 55/DIG. 37
[58] Field of Search ................. 55/507, 509, 501, 503, 55/504, 480–481, 419, 357, DIG. 35, DIG. 31, DIG. 37, 328, 332, 320, 436, 321, 329; 98/108, 114

[56] References Cited

U.S. PATENT DOCUMENTS

| | | | |
|---|---|---|---|
| 2,019,867 | 11/1935 | Nelson | 55/DIG. 31 X |
| 2,214,750 | 9/1940 | Myers | 55/504 X |
| 2,291,383 | 7/1942 | Espenschied | 55/DIG. 31 X |
| 2,575,499 | 11/1951 | Manow | 55/481 X |
| 2,672,206 | 3/1954 | Keist | 55/329 X |
| 2,881,854 | 4/1959 | Uehre, Jr. | 55/480 X |
| 2,964,038 | 12/1960 | Silverman | 55/419 X |
| 3,046,719 | 7/1962 | Tropiano | 55/DIG. 31 X |
| 3,252,580 | 5/1966 | Getzin | 55/503 X |
| 3,345,930 | 10/1967 | Ammons | 98/114 |
| 3,614,860 | 10/1971 | Grellsson | 55/357 X |
| 3,968,738 | 7/1976 | Matzke | 98/108 |

FOREIGN PATENT DOCUMENTS 932629 3/1948 France .................................. 55/320

Primary Examiner—Kathleen J. Prunner
Attorney, Agent, or Firm—Carwell & Helmreich

[57] ABSTRACT

A filter assembly for use especially with air conditioning and heating ducts, comprising first and second rectangular frames, the latter frame being detachably positioned in the first one, and a filter element sandwiched between the rear end of the second frame and a flange seat on the first frame. Interiorly separable snap lock elements on the first and second frames serve to retain the latter frame and filter element in position in the first frame. The second frame is formed into a louver or grill and includes a plurality of horizontally-spaced and inclined slats, the spacing being so as to permit ample flow of air through the assembly, the slats serving as a handle for the insertion and withdrawal of the second frame relative to the first one. The front of the assembly is formed with a rectangular molding to conceal the front edge portions, the front of the assembly extending flush with the surrounding duct wall in the assembled condition of the filter unit, the latter being of a wooden construction to enable finishing or coating of the assembly.

18 Claims, 4 Drawing Figures

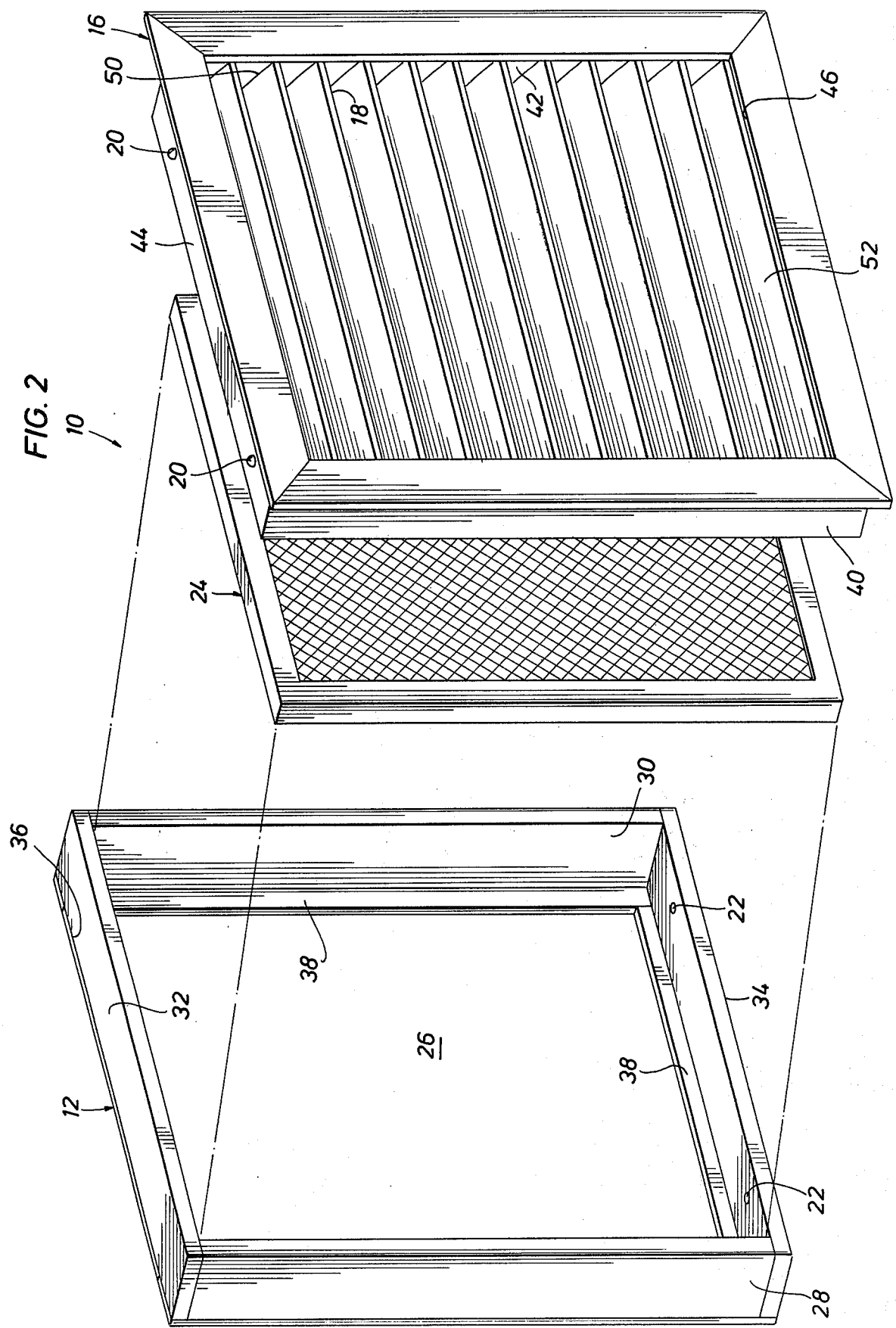

SNAP FILTER GRILL AND ASSEMBLY

BACKGROUND OF THE INVENTION

The present invention, in general, relates to filtering units and assemblies and, more particularly, relates to filter assemblies for use especially in connection with air conditioning or heating ducts.

As is well known in the art, many types of systems which utilize air purifying filters require that the filters employed be periodically removed and cleaned or replaced. Attempts have been made to design filter assemblies in a manner such that the filtering medium utilized can be removed without much difficulty. These attempts have failed in that the state-of-the-art filter assemblies still require complicated latch and locking mechanisms as well as tools to remove the filters or grills from the assemblies.

In addition, in many instances the filter assemblies are relatively bulky which is problematic in cases where an air conditioning return or a heating duct is located in a conspicuous place whose physical appearance or decor is important from the standpoint of aesthetics.

Also, in order to enable a filter grill assembly to be decorated to match its immediate surroundings, it is often desirable that the exterior or front of the grill extends more or less flush with the wall surrounding the duct. Such decoration may, for instance, be in the form of a trimming, molding or similar ornamental strip around the exterior marginal portions or sides of the assembly. Again, such type of ornaments are impossible to secure to the assembly exterior on account of either the bulkiness of the filter assembly or their exteriorly protruding latches or hinges which retain the filter or grill in position relative to the duct or air return.

Still further, prior art filter assemblies oftentimes require the use of unconventional or noncommercial filter media. Frequently, the filtering media have to meet special dimensional requirements or, in another instance, they may have to be compressible. Such special requirements as, for instance, size and shape or compressible or noncompressible filters form a major disadvantage encountered with prior art filtering systems.

One such conventional type of filter assembly is discussed in U.S. Pat. No. 3,250,063 to Andrews. This patent teaches a filter assembly which employs a pair of clip elements which engage around the front and back side of the filter. The filter has to be pushed into or pulled out of the clips. In addition, absent from the Andrews reference is an easily removable or replaceable filter or grill. Also, the Andrews patent is not aesthetically attractive or appealing to match the decor of a room or similar surrounding.

Another prior art filter assembly is taught in U.S. Pat. No. 2,981,367 to Sprouse. Sprouse utilizes two frames which are snapped into interengagement over a filter to retain the latter in the frames. Provided in Sprouse are latches or barbs utilized to maintain the filter in position, which results in compression of the filter. The disadvantage of this assembly is the necessity of having to remove the latches to free the filter. Also, the filter has to be compressible and, moreover, the Sprouse assembly is bulky and, thus, cosmetically unattractive.

In the patent to Burke, U.S. Pat. No. 3,243,942, a gas-filtering system is formed with a series of filters which extend in a zig-zag pattern within the filter frame. The filter employed in Burke is not easily removable.

From the above discussion of the prior art filter systems and assemblies, it will be apparent that it would be advantageous to provide a filter assembly which does not necessitate the use of exterior latch or lock mechanisms, which is desirable as regards its design and which employs conventional or commercially available filter elements.

SUMMARY OF THE INVENTION

Accordingly, it is among the objects of the invention to provide novel, interiorly separable lock means for holding a filter or grill in position in a holding frame, the lock means being simple and inexpensive and which obviate the use of tools.

Another object of the invention is to provide a filter assembly in which the front of the grill extends flush with the air conditioning or heating duct and which enables the attachment of ornaments or decorations to the exterior of the grill upon positioning of the frame assembly relative to the duct, thereby providing a cosmetically and aesthetically attractive filtering unit.

A still further object of the invention is to provide a novel filter assembly designed so as to enable the use of conventional type filter media which do not require to be compressed or special in any shape or dimension.

In accordance with the invention there is provided a snap filter grill and assembly which comprises a first rectangular frame secured to an air conditioning or heating duct and into which a filter element is removably seated, the first frame including a filter-seat flange which engages the filter element upon insertion of the latter into the first frame. A second rectangular frame is seated and positioned within the confines of the first frame and retained in position therein by interiorly disengageable snap lock means comprised of catch elements on the second frame which interact with catch receiving elements on the first frame. The filter element is rectangular in configuration in accordance with the shape of the first and second frames and is sandwiched between the rear side of the second frame and the filter-seat flange on the first flange. The second frame is formed into a louver or grill including a plurality of spaced apart slats which serve as a handle for insertion or withdrawal of the second frame into and from the first frame. A molding conceals the edge or peripheral portions of the second frame in the assembled condition of the filtering unit, in the latter condition in which the front of the second frame extends flush with the surrounding duct wall. Desirably, the frames are made of wood or a material having equivalent characteristics to enable the frames and molding to be finished to match a given surrounding.

These and other objects and advantages will become apparent from the following description of one particular form of the invention as illustrated in the accompanying drawings, in which:

BRIEF DESCRIPTION OF THE DRAWINGS

FIG. 2 is an exploded perspective illustration of the frame and filter assembly of FIG. 1;

DESCRIPTION OF THE PREFERRED EMBODIMENT

Figure 1:
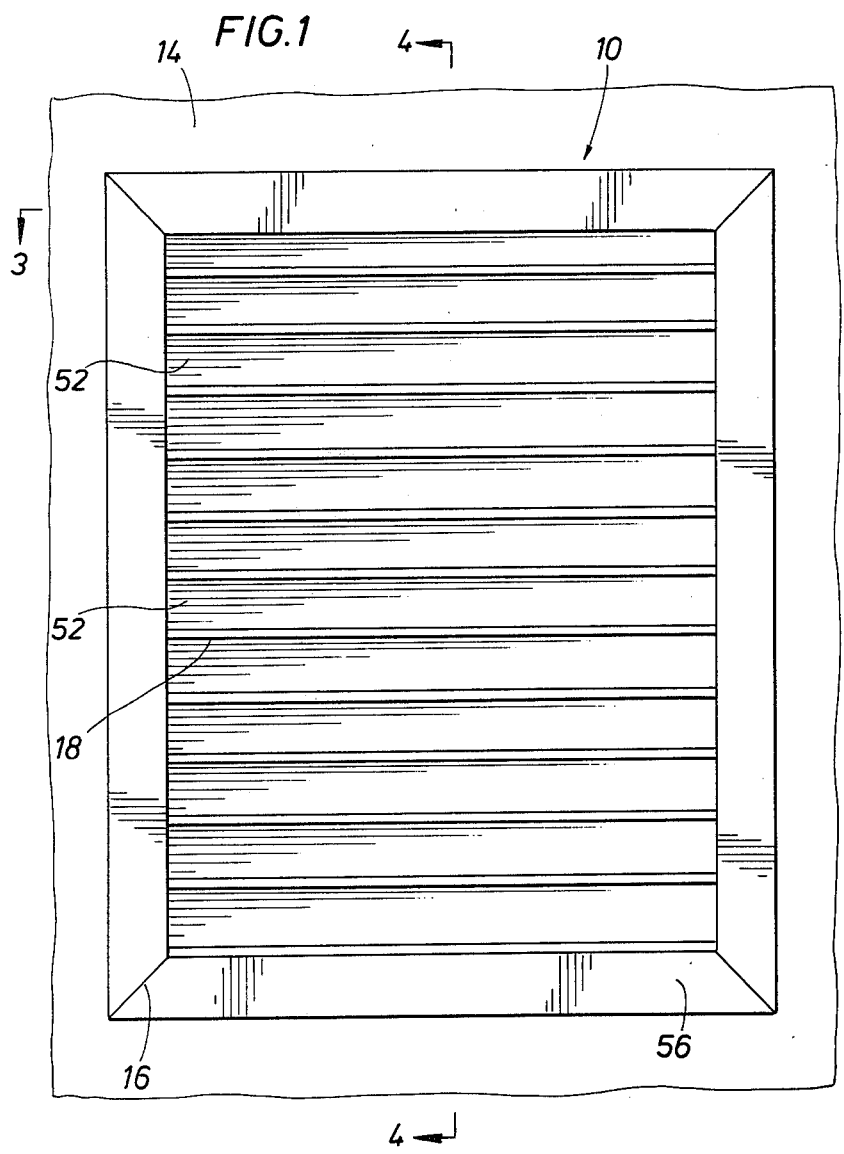
FIG. 1 is a front view of the filter assembly embodying the invention and illustrating the filter-retaining unit as secured to the wall of an air duct.

Referring now to the drawings in which like reference numerals index like parts and with attention initially directed to FIGS. 1 and 2, there is shown a filter assembly, referenced generally by the numeral 10, constructed in accordance with the present invention.

In the embodiment illustrated, the assembly 10, generally, is comprised of a fixed frame 12 which is mounted in the opening of a wall 14 of an air or heating conduit or duct (not shown). A removable frame 16 including louvers 18 for the passage of air, is configured to be removably locked within the confines of fixed frame 12. To this end, lock means comprising interiorly separable catch and catch-receiving elements 20, 22 are provided on the frames 16 and 12, respectively. Frames 12 and 16 function as a filter retaining unit for the purpose of securely maintaining a filter medium 24 in position with respect to duct wall 14.

As best shown in FIG. 2, the fixed frame 12 is rectangular in configuration and consists of a hollow square which forms a compartment 26 for the filter 24, the square being defined by left and right vertically extending opposed side walls 28, 30, and horizontal upper and lower walls 32, 34. The walls are desirably made of wood or material of equivalent characteristics. In the present showing, the rear side 36 of fixed frame 12 is formed with an inwardly directed flange 38, the latter being of corresponding rectangular shape and forming a seat against which the filter 24 is supported in the assembled condition of filter assembly 10. The flange 38 which extends at substantially right angles to the adjoining walls 28, 30, and 32, 34, is also made of wood or material of equivalent characteristics.

Figure 4:
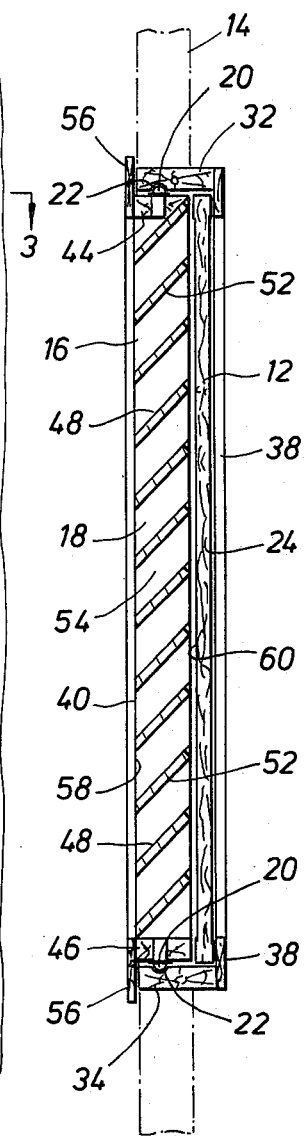
FIG. 4 is a cross-sectional side view of the filter assembly taken on line 4—4 of FIG. 1.
Figure 3:
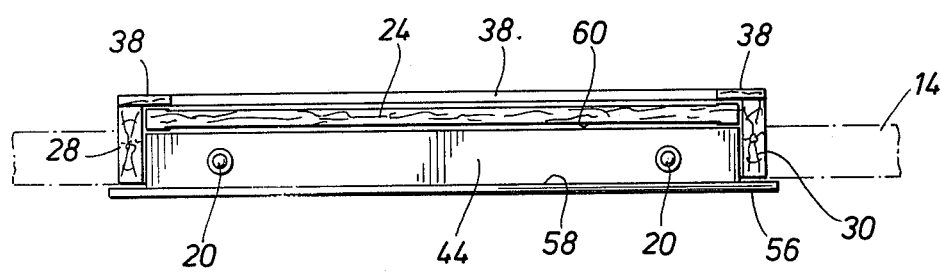
FIG. 3 is a cross-sectional top view of the filter assembly taken on line 3—3 of FIG. 1.

As best appears in FIGS. 2, 3 and 4, removable frame 16 is rectangular in configuration in accordance with the shape of fixed frame 12 and is comprised of left and right vertically extending opposed side walls 40, 42, and horizontal upper and lower walls 44, 46. The inner planar surfaces of side walls 40, 42, are formed with a series of inclined grooves 48, 50, respectively, arranged for receiving end portions of a plurality of slats 52. Slats 52 form the louvers 18 within the confines of the hollow square defined by the side walls 40,42, and upper and lower walls 44, 46. Grooves 48, 50 extend from top to bottom of frame 16 and are separated a predetermined distance by raised portions 54. The grooves are so arranged in their respective side walls that the grooves in one wall are in horizontal alignment with the grooves of the opposite wall, thereby the provide for uniform spacing between adjacent louver slats. In the embodiment shown, the grooves 48, 50, and, consequently, the slats 52, are inclined to the horizontal at an angle of 45°. The spacing between the slats 52 is sufficiently large as to provide for unobstructed and ample air passage to accommodate the duct. In the preferred embodiment the spacing between each two adjacent slats is about 1.5 inches. The thickness and widths of the individual slats is so chosen as to permit the latter to be used as a handle for disengaging the removable frame 16 from fixed frame 12 when desired.

A molding 56, desirably made of wood, is secured to the front 58 of removable frame 16. Molding 56 is of rectangular configuration in accordance with the shape of removable frame 16. Molding 56 is configured with an inner dimension slightly smaller than the outer dimension of frame 16 to conceal the marginal portions or edges of the latter frame. Also, molding 56 has an outer dimension larger than that of frame 16 to cover portions of the adjoining wall, e.g., duct wall 14.

Removable frame 16 is dimensioned so that its overall height and width is slightly smaller than these interior dimensions of fixed frame 12, yet so that the frame 16 will freely slide into the hollow interior 26 of fixed frame 12. When positioned in fixed frame 12, removable frame 16 has a depth which combined with the thickness of filter 24 is equal to the depth of frame 12.

In assembled condition, the filter 24 is positioned in fixed frame 12 and is sandwiched between filter-seat flange 38 of frame 12 and the rear side 60 of removable frame 16, FIGS. 3 and 4.

The structure of filter medium 24 may be constituted, for example, by fibers supported in a rectangular frame and which structure is open at its opposite faces to permit the passage of air therethrough. The height and width of filter medium 24, typically, is equal to the height and width of the interior wall surfaces of the fixed frame 12 to eliminate unintended by-passing of air. A filter structure of this type can be properly sized, if necessary, and no special filter media need to be used.

As best illustrated in FIGS. 3 and 4, catch elements 20 are formed on the outer planar surfaces of horizontal top and bottom walls 44, 46, of removable frame 16. The catch elements 20 extend in spaced apart relation with respect to each other and in longitudinal orientation of the walls. The elements 20 on top wall 44 are vertically aligned with their counterparts on bottom wall 46. Typically, the catch elements 20 are of the "bullet"-type and extend outwardly from the outer surfaces of walls 44, 46.

The catch-receiving elements 22, in turn, are formed in the inner planar surfaces of the top and bottom walls 32, 34, of fixed frame 12 likewise, the catch-receiving elements 22 extend in spaced apart relation with respect to each other and in longitudinal orientation of the walls. The elements 22 in top wall 32 are vertically aligned with their counterparts in bottom wall 34. Typically, catch-receiving elements 22 are of the detent-type.

In practice, the catch elements 20 in the top and bottom walls 44, 46, of removable frame 16 and catch-receiving elements 22 in the top and bottom walls 32, 34, of fixed frame 12 are positioned such that upon positioning removable frame 16 in fixed frame 12, are aligned with each other. When removable frame 16 is inserted into position in fixed frame 12, catch elements 20 are urged into engagement with catch-receiving elements 22, in which condition the former elements 20 impose a continuing axial resilient latching pressure against catch-receiving elements 22. By manually pushing removable frame 16 to dead center position of frame 12, catch elements 20 are urged into position onto the catch-receiving elements 22 and, thereby, provide a snap-action type of locking means.

Conversely, in disengaging removable frame 16 from fixed frame 12, e.g., to replace the filter 24, catch elements 20 are urged out of position from catch-receiving elements 22, thereby releasing the locking engagement between the two associated frames 12 and 16.

As will be appreciated from the above, in assembled condition of the frames 12 and 16, the lock means comprised of catch elements 20 and catch-receiving elements 22 are concealed from view. Also, to remove removable frame 16 out of engagement with fixed frame 12, all that is necessary is to manually grasp the louver slats 52 and pull the frame 16 backwards and out of the confines of fixed frame 12.

Modifications and changes from the preferred form of the invention illustrated and described above are within the contemplation of the invention, and all such modifications and changes not departing from the spirit of the invention are intended to be embraced within the scope of the appended claims.

What is claimed is:

1. A filter assembly, comprising:
   a rectangular fixable frame member having horizontal and vertical walls defining a compartment having a flange means therein;
   a rectangular louvered grill detachably positioned in said compartment and having an outer configuration corresponding to the inner shape of said compartment, said grill including horizontal and vertical walls;
   lock means associated with said fixable frame and said grill interiorly of the former to retain said grill in position in said fixable frame, said lock means being self-releasing in response to axial movement of said grill relative to said fixable frame, and said lock means comprising separable elements in the form of a catch member secured to a wall of said grill and a catch-receiving member arranged to releasably engage said catch member and being secured to a wall of said fixable frame; and
   a filter medium removably seated in said fixable frame and sandwiched between said flange means and said grill, the louvers of said grill serving as a handle for insertion and withdrawal of said grill relative to said fixable frame.

2. The filter assembly of claim 1 wherein the walls of said fixable frame and said grill include inner and outer surfaces, and said catch member is secured to said outer surface of a grill wall, and said catch-receiving member is secured to an inner surface of a fixable frame wall.

3. The filter assembly of claim 2 wherein at least two catch members and two catch-receiving members are formed on a pair of associated inner and outer surfaces of said fixable frame and said grill.

4. The filter assembly of claim 2 wherein said catch-receiving member is in the form of a detent member and said catch member is of the bullet locking type to provide engagement with said detent member.

5. A filter assembly, comprising:
   a fixable frame member defining a compartment having a flange means therein;
   a louvered grill detachably positioned in said compartment, said grill comprising a rectangular grill frame bounding a louver structure secured to said grill frame;
   lock means associated with said fixable frame and said grill interiorly of the former to retain said grill in position in said fixable frame, said lock means being self-releasing in response to axial movement of said grill relative to said fixable frame; and
   a filter medium removably seated in said fixable frame and sandwiched between said flange means and said grill, the louvers of said grill serving as a handle for insertion and withdrawal of said grill relative to said fixable frame.

6. The filter assembly of claim 5 wherein said compartment is defined by the walls of said fixable frame including two vertical walls and two horizontal walls.

7. The filter assembly of claim 5 wherein said grill frame comprises two spaced vertical walls, and said louver structure comprises a plurality of horizontally spaced slats having outer ends secured to said walls.

8. The filter assembly of claim 7 wherein said vertical walls are formed with grooves and said outer ends of said slats are fixedly secured in said grooves, said grooves and slats extending at an acute angle to the horizontal.

9. The filter assembly of claim 8 wherein said grill frame has a major axis and a minor axis and said slats extend at an angle of 45° relative to said major axis.

10. The filter assembly of claim 5, wherein said lock means comprises separable elements in a form of a catch member secured to said grill and a catch-receiving member secured on said fixable frame.

11. The filter assembly of claim 10 wherein said catch-receiving member is in the form of a detent member arranged to receive said catch member.

12. The filter assembly of claim 11 wherein said catch member is of the bullet-locking type and provides a snap-lock latching action with said detent member.

13. The filter assembly of claim 10 wherein at least two catch members and two catch-receiving members are provided and each catch-receiving member is in the form of a detent member arranged to receive one of said catch members.

14. The filter assembly of claim 13 wherein said catch members are of the bullet-locking type and provide a snap-lock latching action with said detent members.

15. The filter assembly of claim 5, wherein said grill is further formed with a molding having an inner peripheral dimension smaller than the outer peripheral dimension of said grill frame and an outer-peripheral dimension greater than that of said grill frame.

16. A filter assembly, comprising;
   a fixable wooden frame member defining a compartment having a flange means therein;
   a louvered wooden grill detachably positioned in said compartment and having an outer configuration corresponding to the inner shape of said compartment;
   lock means associated with said fixable frame and said grill interiorly of the former to retain said grill in position in said fixable frame, said lock means being self-releasing in response to axial movement of said grill relative to said fixable frame; and
   a filter medium removably seated in said fixable frame and sandwiched between said flange means and said grill, the louvers of said grill serving as a handle for insertion and withdrawal of said grill relative to said fixable frame.

17. The filter assembly of claim 16, wherein said lock means includes a catch member secured to said grill and a catch-receiving member secured to said fixable frame.

18. The filter assembly of claim 17, wherein said catch member is of the bullet-locking type and said catch-receiving member is a detent member, said catch member being releasably engageable with said detent member.

* * * * *